United States Patent
Volant et al.

(10) Patent No.: US 7,480,538 B2
(45) Date of Patent: *Jan. 20, 2009

(54) METHODS, SYSTEMS, AND COMPUTER PROGRAM PRODUCTS FOR MANAGING MOVEMENT OF WORK-IN-PROCESS MATERIALS IN AN AUTOMATED MANUFACTURING ENVIRONMENT

(75) Inventors: Richard P. Volant, New Fairfield, CT (US); Bradley P. Jones, Pleasant Valley, NY (US); Sameer T. Shikalgar, Wappingers Falls, NY (US); Michael J. Toner, Hopewell Junction, NY (US); Yutong Wu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/939,792

(22) Filed: Nov. 14, 2007

(65) Prior Publication Data

US 2008/0167733 A1 Jul. 10, 2008

Related U.S. Application Data

(63) Continuation of application No. 11/621,693, filed on Jan. 10, 2007, now Pat. No. 7,369,911.

(51) Int. Cl.
G06F 19/00 (2006.01)
(52) U.S. Cl. ...................................................... 700/99
(58) Field of Classification Search ........... 700/99–102; 705/8–10
See application file for complete search history.

(56) References Cited

U.S. PATENT DOCUMENTS

| | | | |
|---|---|---|---|
| 3,762,907 | A | 10/1973 | Quinn et al. |
| 4,364,764 | A | 12/1982 | Farkas et al. |
| 5,818,716 | A | 10/1998 | Chin et al. |
| 5,841,677 | A | 11/1998 | Yang et al. |
| 5,993,041 | A | 11/1999 | Toba |
| 6,041,267 | A | 3/2000 | Dangat et al. |
| 6,480,756 | B1 | 11/2002 | Luh et al. |
| 6,625,636 | B1 | 9/2003 | Skovira |
| 6,647,307 | B1 | 11/2003 | Huang et al. |
| 6,889,178 | B1 | 5/2005 | Chacon |
| 6,931,295 | B2 | 8/2005 | Lin et al. |
| 6,975,914 | B2 | 12/2005 | DeRemer et al. |

(Continued)

Primary Examiner—M. N. Von Buhr
(74) Attorney, Agent, or Firm—Cantor Colburn LLP; Kerry Goodwin

(57) ABSTRACT

Methods, systems, and computer program products for managing movement of work-in-process materials between processing units in an automated manufacturing environment are provided. A system includes a host system in communication with a work-in-process (WIP) material lot. The system also includes an application executing on the host. The application implements a method that includes tracking a position of the WIP material lot, receiving a list of the processing units designated to be inoperative during a down time, and receiving a start time and a duration of the down time. The method also includes determining a maximum dwell time for each of the designated processing units and scheduling movement of the WIP material lot during an interim between a current time and the start time of the down time based on current position of the work-in-process material lot, the current time, the start time and duration of the down time, and the maximum dwell time.

14 Claims, 2 Drawing Sheets

U.S. PATENT DOCUMENTS 7,151,972 B2   12/2006  Denton et al.
7,197,369 B1    3/2007  Chien et al.
2004/0260419 A1  12/2004  Chen
2005/0096770 A1   5/2005  Chua et al.
2006/0052898 A1   3/2006  Blumenfeld el al.

METHODS, SYSTEMS, AND COMPUTER PROGRAM PRODUCTS FOR MANAGING MOVEMENT OF WORK-IN-PROCESS MATERIALS IN AN AUTOMATED MANUFACTURING ENVIRONMENT

CROSS REFERENCE TO RELATED APPLICATIONS

This application is a continuation application of U.S. Ser. No. 11/621,693 filed Jan. 10, 2007, the contents of which are incorporated by reference herein in their entirety.

BACKGROUND OF THE INVENTION

The present disclosure relates generally to automated material handling systems and, in particular, to methods, systems, and computer program products for managing movement of work-in-process (WIP) materials in an automated manufacturing environment.

In a production environment, quantities of materials are transported through a defined route in an automated manufacturing line, e.g., among processing units, as well as temporary storage locations (e.g., stockers) situated within the route where the materials await further transport and processing. Oftentimes, there are instances where the materials sit idle in these storage locations until a production machine, or processing unit, is ready to receive them. When there is a large amount of materials in a given manufacturing line, the local stockers can become filled to capacity and the production area becomes backed up. Automated material handling systems (AMHSs) provide some assistance in managing the transport of these materials within a production area. AMH systems generally consist of material handling equipment and a material control system. The material handling equipment manages the flow of materials, while the control system manages the flow of information relating to these materials. Where an automated material handling system (AMHS) is employed, these idle materials are often automatically transferred to central storage when a stocker is fall, regardless of whether the materials will be needed by the production line soon.

When a manufacturing line is shut down, either by a planned maintenance, retooling, or by unforeseen circumstances, the production materials may be subject to various degrees of degradation. For example, in a semiconductor fabrication facility, certain production materials, such as chemically treated wafers, if left exposed in a location within the production route for a specified period of time, may suffer oxidation or similar types of hazards. Depending upon the length of the equipment shutdown period, the results can be devastating, particularly when expensive production materials need to be scrapped as a result of damage due to environmental exposure. Moreover, the costs of additional cycle time and reduced equipment utilization exacerbate this problem.

What is needed, therefore, is a way to manage the movement of production materials in an automated manufacturing line that preserves the integrity of the production materials during shut down of the processing equipment in the manufacturing line.

BRIEF SUMMARY OF THE INVENTION

Embodiments of the invention include systems for managing movement of work-in-process materials between processing units in an automated manufacturing environment. A system includes a host system in communication with a work-in-process (WIP) material lot. The system also includes an application executing on the host. The application implements a method that includes tracking a position of the WIP material lot, receiving a list of the processing units designated to be inoperative during a down time, and receiving a start time and a duration of the down time. The method also includes determining a maximum dwell time for each of the designated processing units and scheduling movement of the WIP material lot during an interim between a current time and the start time of the down time based on current position of the work-in-process material lot, the current time, the start time and duration of the down time, and the maximum dwell time.

Additional embodiments include a system for managing movement of work-in-process (WIP) materials between processing units in an automated manufacturing environment. The system includes an automated manufacturing line having multiple processing units, at least one work-in-process material lot positioned at a given instant in time at a point along the automated manufacturing line, the work-in-process material lot including production materials, and a process controller coupled to the work-in-process material lot. The system also includes a means for tracking the position of the work-in-process material lot and a means for determining and inputting to the process controller an actual down time having a start time and a duration, and a list of one or more of the processing units inoperative during the down time. The system also includes a solver product, and a database accessible by the solver product including information regarding a plurality of maximum dwell times, each of the maximum dwell times associated with one of the processing units for which a work-in-process material lot may remain at a given processing unit while maintaining a minimum threshold integrity value of the production materials. The solver product is responsive to the position of the work-in-process material lot, the duration of the down time, and the maximum dwell time to generate a report identifying actual dwell time and maximum dwell time for the work-in-process material lot.

Further embodiments include a method for managing movement of work-in-process materials between processing units in an automated manufacturing environment. The method includes tracking a position of the WIP material lot, receiving a list of the processing units designated to be inoperative during a down time, and receiving a start time and a duration of the down time. The method also includes determining a maximum dwell time for each of the designated processing units and scheduling movement of the WIP material lot during an interim between a current time and the start time of the down time based on current position of the work-in-process material lot, the current time, the start time and duration of the down time, and the maximum dwell time.

Further embodiments include a computer program product for managing movement of work-in-process materials between processing units in an automated manufacturing environment. The computer program product includes instructions for implementing a method. The method includes tracking a position of the WIP material lot, receiving a list of the processing units designated to be inoperative during a down time, and receiving a start time and a duration of the down time. The method also includes determining a maximum dwell time for each of the designated processing units and scheduling movement of the WIP material lot during an interim between a current time and the start time of the down time based on current position of the work-in-process material lot, the current time, the start time and duration of the down time, and the maximum dwell time.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments are directed to methods, systems, and computer program products for managing work-in-process (WIP) material undergoing processing in an automated manufacturing line. The system may be used to manage movement of WIP materials prior to a planned complete or partial shutdown of the automated manufacturing line. Based on a known position of the WIP materials along the line, plus knowledge of when the shutdown will occur, as well as the location where the WIP materials should be held, or "parked", during the shutdown in order to minimize any damage to the materials during the shutdown period, and knowledge of how long it will take the WIP material to reach a safe parking location, the system generates a plan regarding locations at which specific WIP materials should be held prior to the shutdown. In addition, the system may generate a report after an occurrence of an unplanned shutdown, providing information regarding the status of WIP materials; for example, identifying WIP materials that are positioned at a location where damage will occur relatively quickly, and thus which requires prompt attention.

Figure 1:
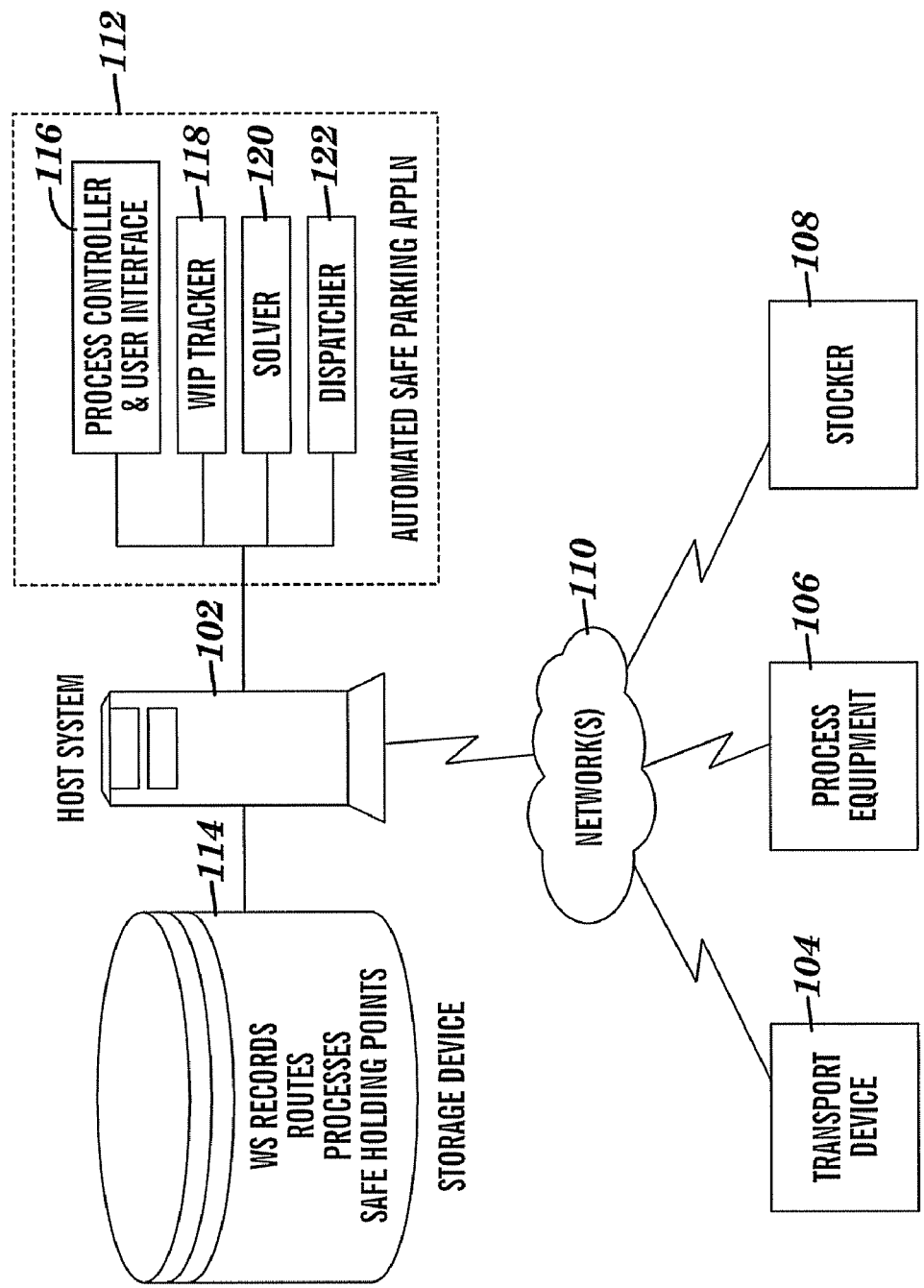
FIG. 1 depicts a portion of a system upon which automated WIP movement management functions may be implemented in accordance with exemplary embodiments.

Turning now to FIG. 1, a portion of a system upon which automated WIP movement management functions may be implemented in accordance with exemplary embodiments will now be described. The system of FIG. 1 includes a host system 102 in communication with manufacturing equipment (104, 106, 108) over one or more networks 110. In exemplary embodiments, the host system 102 is implemented by a manufacturing enterprise that has adopted enterprise standards, such as SEMI®, or Semiconductor Equipment and Materials International®, headquartered in San Jose, Calif.

The host system 102 executes a variety of business applications utilized by an enterprise for facilitating the production processes occurring in the manufacturing environment of FIG. 1. Host system 102 may be implemented by a computer with a high-powered processor for handling the volume of production activities occurring in the manufacturing environment of FIG. 1. Types of business applications executed by host system 102 may include a manufacturing execution system (MES), automated material handling system (AMHS), and similar types of software. The AMHS manages the transport of materials within the manufacturing environment of FIG. 1 and interfaces with the MES for receiving operations and scheduling information for processing of materials on equipment in the manufacturing area, as well as other functions.

The host system 102 also executes one or more applications for implementing the automated WIP movement management functions. These one or more applications are collectively referred to as an automated safe parking application 112.

The manufacturing equipment includes a transport device 104, process equipment, and stocker 108. The manufacturing equipment may be maintained in one or more production bays that each includes process tools, as well as work-in-process (WIP) materials engaged in, or awaiting, a process or procedure performed by the tools. Materials that may be used in manufacturing may include substances, component parts, assemblies, and other items typically found in a manufacturing environment. WIP materials refer to those materials that are currently undergoing a machine process or en route between machines (e.g., processing units 106) or production bays. Materials that are awaiting processing may be stored in local storage (e.g., local stocker 108). An interbay/intrabay transport device (e.g., transport device 104) enables WIP materials to be conveyed between and within production bays, respectively.

Each of the processing units provides one location within the manufacturing environment of FIG. 1 whereby a specified manufacturing process is performed on the WIP materials in accordance with a manufacturing plan. Transport device 104 may be a mechanized ground vehicle such as an automated guided vehicle (AGV) or personal guided vehicle (PGV), or may be an overhead transport (OHT) device supported by a monorail that transfers WIP materials between and within production bays.

As indicated above, stocker 108 refers to a temporary storage device used to retain materials that are awaiting processing in a manufacturing area. In a typical manufacturing environment, a transport vehicle (e.g., transport device 104) retrieves WIP materials from a local stocker (e.g., stocker 108) and transports the materials to the processing unit 106 to which the materials have been assigned. These process materials are assigned to various production bays, some of which materials may be ready for processing within minutes and others that may be waiting for hours or days. For example, the materials stored in a local stocker may be assigned to a current job (e.g., next in line in processing), a short-term pending job (e.g., ready for processing within minutes or hours), or a long-term pending job (e.g., hours or days). If the scheduled production cycle is interrupted for any period of time, this can result in exposure of the materials to environmental hazards within the production area, as well as costly degradation of the quality of the materials.

While only one of each type of equipment is shown in the system of FIG. 1, it will be understood that multiple equipment devices may be employed in order to realize the advantages of the exemplary embodiments.

Networks 110 may comprise any type of communications network. In preferred embodiments, networks 110 include an Ethernet local area network (LAN).

Host system 102 is in communication with a storage device 114. Storage device 114 stores a variety of data used by the host system 102. Storage device 114 may be logically addressable to host system 102 for receiving requests for data and communicating search results to the host system 102. One type of data stored in storage device 114 is production data. Production data refers to the specific information used by the AMHS to perform transport activities in accordance with scheduled production operations. For example, production data may include tables identifying each local stocker, the stockers' current load and capacity, the materials carried within the stocker, etc. Detailed performance metrics for stockers may also be stored as part of production data such as relative throughputs, mean stocker cycle times for materials capacity, peak stocker cycle times for materials, stocker mean times between incidents, stocker availability, alarm conditions relating to carrier drops, weight loads, contamination control, charge build up on carrier, etc. These and other SEMI-derived performance metrics standards may be utilized. Production data may also include process steps for manufacturing processes utilized within the manufacturing area of FIG. 1, the status of production activities occurring within production bays, etc.

The storage device 114 may also store transport process jobs. Transport process jobs may include work orders or directives that instruct the AMHS to carry out specified operations on candidate materials selected for movement.

The storage device 114 also stores maximum dwell times associated with the processing units for which a work-in-process material lot may remain at a given processing unit while maintaining a minimum threshold integrity value of the production materials. The minimum threshold value may be determined using any criteria. For example, the minimum threshold value may be determined as a function of the percentage of loss resulting from exposure of the production materials, which is expressed in dollars. Integrity values specify an assessed worth of the production materials, which may be based upon, e.g., costs of their replacement.

The automated safe parking application 112 may include various components, which collectively perform the automated WIP movement management functions described herein. As shown in the system of FIG. 1, the automated safe parking application 112 executes a process controller and user interface 116, a WIP tracker 118, a solver 120, and a dispatcher 122. The automated safe parking application 112 may be a stand-alone application or may be integrated with an MES or AMHS tool.

The process controller is in communication with the WIP materials and the user interface 116 provides the capability for a user (e.g., a representative of the enterprise implementing the host system 102) to input to the process controller an actual, or projected future, down time having a start time and a duration, and a list of one or more of the processing units (e.g., processing equipment 106) that will be inoperative during the down time. The down time refers to a period of time in which one or more equipment devices (e.g., process equipment 106) will be inoperative; that is, the work station is not processing production materials specified in the production plan.

The WIP tracker 118 tracks the position of the WIP materials as they are transported through the manufacturing area (e.g., from unit to unit, stocker to unit, stocker to stocker, etc.), e.g., via signaling transmissions between the equipment 104-108 and the WIP tracker 118 and storing the data in the tables of storage device 114. The solver 120 accesses information in the storage device 114, such as maximum dwell times, process routes/steps, safe holding points, etc., and is responsive to the position of the WIP materials, the duration of the down time, the maximum dwell time, and other information and determines how and when to schedule movement of the WIP materials accordingly. The solver 120 assigns an indicator to each of the WIP materials and transmits the indicator to the dispatcher 122 for execution. In alternative exemplary embodiments, the solver 120 is responsive to the position of the WIP materials, the duration of the down time, the maximum dwell time, and other information to generate a report identifying the actual dwell time and maximum dwell time for the materials.

Figure 2:
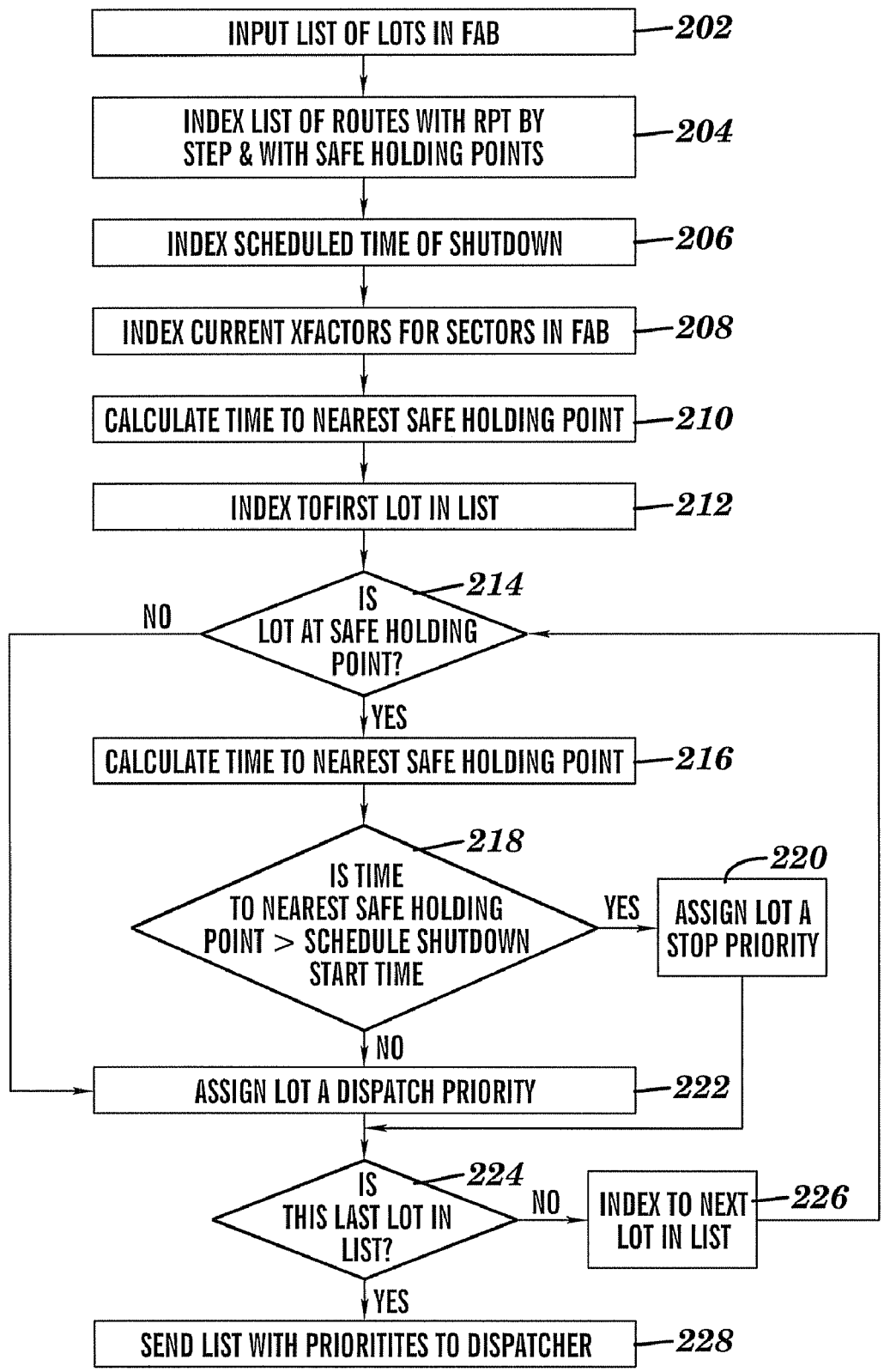
FIG. 2 is a flow diagram describing a process for managing movement of WIP materials in a manufacturing environment in exemplary embodiments.

Turning now to FIG. 2, a flow diagram describing a process for managing movement of WIP materials in a manufacturing environment will now be described in exemplary embodiments. At step 202, a user of the automated safe parking application 112 inputs a list of WIP materials (also referred to as "lots") to the host system 102 via the user interface component 116. At step 204, a list of routes with raw process time (RPT) by process steps and with safe holding points are indexed. Each process flow or route defines the processing steps that any particular WIP materials will receive that is assigned to that route. The indexing may be implemented by reading this information in the route and accessing and sorting the information as it is to be used in each of the subsequent processing steps. The information contains data such as the RPT, safe holding points, and any other pertinent data directly associated with the routing of the production materials as it relates to its processing and storage.

The safe holding points refer to locations in the manufacturing area that are deemed safe for storing the WIP materials. This determination may be made by identifying locations that do not pose a threat to the integrity of the materials when they are located or temporarily stored at the locations.

At step 206, the user indexes a scheduled time of shutdown (e.g., a start time of the shutdown whereby one or more processing units 106 will be inoperative). At step 208, current XFACTORS for various sectors in the manufacturing area are indexed. XFACTORS refer to a calculation that divides the total cycle time for a lot by the raw process time to determine the ratio of active processing and wait time to the active process time only. This information is used by the solver 120 to determine assignment of lots for dispatch priority or hold as described herein.

At step 210, the transport time for moving each of the lots to the next nearest identified safe holding point is calculated. At step 212, the first lot in the list is selected for review.

At step 214 it is determined whether the lot is currently at a safe holding point. As indicated above, this may be determined by identifying the current time, the scheduled shut down start time and duration, the XFACTOR, and a current position of the lot in its route. If the lot is not currently at a safe holding point at step 214, the lot is assigned a dispatch priority indicator at step 222. The dispatch priority indicator ensures that the movement of the lot will be given priority in order to minimize or eliminate degradation to the lot. The dispatch priority may be implemented by flagging the lot information stored in the storage device 114 and tasking the dispatcher 122 to perform the dispatch priority movement of the lot as indicated in the process route for the lot. Otherwise, if the lot is currently at a safe holding point, the transport time to the next nearest safe holding is calculated at step 216.

At step 218, it is determined whether the time to the nearest safe holding point is greater than the scheduled shutdown start time. If so, this means that the lot is determined to have adequate time to reach the next nearest safe holding point before the scheduled shut down time. In this event, the lot is assigned a stop priority indicator at step 220, reflecting that no further action is required for this lot with respect to the automated safe parking application 112 functions (e.g., the lot is handled according to the processing instructions in the process route).

If, however, the time to the nearest safe holding point is less than or equal to the scheduled shut down start time, the lot is assigned a dispatch priority at step 222 as described above.

The processes described with respect to steps 214 to 222 may be repeated for each lot in the list.

It is then determined whether this is the last lot in the list at step 224. If not, the next lot in the list is selected at step 226 and the process returns to step 214 as described above. Otherwise, the list is sent with assigned lot priorities to the dispatcher 122 at host system 102 for execution. The dispatcher 122 ensures that lots assigned with priority dispatch indicators are transported to a safe holding point prior to the initiation of the shutdown.

In alternative exemplary embodiments, an unexpected disruption of the manufacturing environment may occur, such as a power outage or equipment breakdown. In this embodiment, the automated safe parking application 112 generates a report upon the occurrence of an unplanned shutdown, providing information regarding the status of the WIP materials, e.g., identifying WIP materials that are positioned at a processing equipment 106 where damage will occur relatively quickly, thereby requiring prompt attention.

For example, a report may provide information identifying each of the WIP materials in production, in temporary storage, and en route. The report may further list the current locations of each WIP materials as of the time of shutdown, as well as the anticipated integrity values over time (e.g., based upon the shut down time period, type of materials, and current locations). In this manner, priorities can be determined as to which lots should receive priority treatment when the equipment is back up and running.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for managing movement of work-in-process (WIP) materials between processing units in an automated manufacturing environment, comprising:
    a host system in communication with a work-in-process material lot, the work-in-process material lot including production materials; and
    an automated safe parking application executing on the host system, the automated safe parking application implementing a method, comprising:
        tracking a position of the work-in-process material lot;
        receiving a list of one or more of the processing units designated to be inoperative during a future projected down time;
        receiving a start time and a duration of the future projected down time;
        determining a maximum dwell time associated with each of the designated processing units, the maximum dwell time specifying a maximum amount of time the work-in-process material lot may remain at each of the designated processing units while maintaining a minimum threshold integrity value of the production materials; and
        scheduling movement of the work-in-process material lot during an interim between a current time and the start time of the future projected down time based on a current position of the work-in-process material lot, the current time, the start time and duration of the future projected down time, and the maximum dwell time.

2. The system of claim 1, wherein scheduling the movement of the work-in-process material lot includes assigning a dispatch priority indicator to the work-in-process material lot when the maximum dwell time is met or exceeded, the method further comprising:
    transmitting the dispatch priority indicator to a dispatcher for execution.

3. The system of claim 2, wherein the dispatch priority indicator is operable for expediting movement of the work-in-process material lot to a nearest location in the automated manufacturing line that is determined to be capable of maintaining the minimum threshold integrity value of the production materials.

4. The system of claim 1, wherein scheduling the movement of the work-in-process material lot includes assigning a stop priority indicator to the work-in-process material lot when the maximum dwell time is not exceeded, the method further comprising:
    transmitting the stop priority indicator to a dispatcher for execution.

5. The system of claim 4, wherein the stop priority indicator is operable for maintaining the current position of the work-in-process material lot for the duration of the projected future down time.

6. The system of claim 1, wherein the method further comprises:
    assigning the minimum threshold integrity value to the designated processing units, wherein the minimum threshold integrity value is based on a projected maximum acceptable degradation of the production materials.

7. A system for managing movement of work-in-process (WIP) materials between processing units in an automated manufacturing environment, comprising:
    an automated manufacturing line having multiple processing units;

at least one work-in-process material lot positioned at a given instant in time at a point along the automated manufacturing line, the at least one work-in-process material lot including production materials;

a process controller operably coupled to the at least one work-in-process material lot;

means for tracking the position of the at least one work-in-process material lot;

a means for determining and inputting to the process controller an actual down time having a start time and a duration, and a list of one or more of the processing units inoperative during the down time;

a solver product; and a database accessible by the solver product including information regarding a plurality of maximum dwell times, each of the maximum dwell times associated with one of the processing units for which a work-in-process material lot may remain at a given processing unit while maintaining a minimum threshold integrity value of the production materials;

wherein the solver product is responsive to the position of the at least one work-in-process material lot, the duration of the down time, and the maximum dwell time to generate a report identifying actual dwell time and maximum dwell time for the at least one work-in-process material lot.

8. The system of claim 7, wherein the actual down time reflects an unplanned interruption in the operation of one or more of the processing units.

9. A computer program product for managing movement of work-in-process (WIP) materials between processing units in an automated manufacturing environment, the computer program product including instructions for implementing a method, comprising:

tracking a position of a work-in-process material lot, the work-in-process material lot including production materials;

receiving a list of one or more of the processing units designated to be inoperative during a future projected down time;

receiving a start time and a duration of the future projected down time;

determining a maximum dwell time associated with each of the designated processing units, the maximum dwell time specifying a maximum amount of time the work-in-process material lot may remain at each of the designated processing units while maintaining a minimum threshold integrity value of the production materials; and scheduling movement of the work-in-process material lot during an interim between a current time and the start time of the future projected down time based on a current position of the work-in-process material lot, the current time, the start time and duration of the future projected down time, and the maximum dwell time.

10. The computer program product of claim 9, wherein scheduling the movement of the work-in-process material lot includes assigning a dispatch priority indicator to the work-in-process material lot when the maximum dwell time is met or exceeded, the method further comprising:

transmitting the dispatch priority indicator to a dispatcher for execution.

11. The computer program product of claim 10, wherein the dispatch priority indicator is operable for expediting movement of the work-in-process material lot to a nearest location in the automated manufacturing line that is determined to be capable of maintaining the minimum threshold integrity value of the production materials.

12. The computer program product of claim 9, wherein scheduling the movement of the work-in-process material lot includes assigning a stop priority indicator to the work-in-process material lot when the maximum dwell time is not exceeded, the method further comprising:

transmitting the stop priority indicator to a dispatcher for execution.

13. The computer program product of claim 12, wherein the stop priority indicator is operable for maintaining the current position of the work-in-process material lot for the duration of the projected future down time.

14. The computer program product of claim 9, further comprising instructions for implementing:

assigning the minimum threshold integrity value to the designated processing units, wherein the minimum threshold integrity value is based on a projected maximum acceptable degradation of the production materials.

* * * * *